UNITED STATES PATENT OFFICE.

FRÉDÉRIC BENKER AND HENRI LASNE, OF PARIS, FRANCE.

MANUFACTURE OF SULPHURIC ACID.

SPECIFICATION forming part of Letters Patent No. 250,416, dated December 6, 1881.

Application filed October 11, 1881. (No model.) Patented in France October 30, 1880.

*To all whom it may concern:*

Be it known that we, FRÉDÉRIC BENKER and HENRI LASNE, both of Paris, in the Republic of France, have invented certain new and useful Improvements in the Manufacture of Sulphuric Acid, of which improvements the following specification is a full description.

This invention relates to the absorption in what is known as the "Gay-Lussac tower" of the nitrous compounds contained in the gases passing off from the vitriol-chambers.

It consists in mixing with the gases which pass from the vitriol-chambers into the Gay-Lussac tower sulphurous-acid gas in proportions regulated as hereinafter explained. We have found that it is as nitrous peroxide passing off from the Gay-Lussac tower that the greater part of the loss of niter at present experienced by manufacturers of sulphuric acid takes place, and that this source of loss of niter may be practically avoided altogether by mixing the gases which pass from the vitriol-chambers into the Gay-Lussac tower with a suitable proportion of sulphurous-acid gas. According to our observation and experience sulphuric acid of the strength ordinarily employed in the Gay-Lussac tower cannot combine chemically with nitric peroxide. It can dissolve small quantities of nitric peroxide, but the quality of nitric peroxide which it can retain in solution under the conditions which have place in the Gay-Lussac tower is inappreciable. With nitrous acid, however, sulphuric acid in a state as concentrated as that employed in the Gay-Lussac tower combines chemically, forming therewith the very stable compound which some chemists call "nitrosulphonic acid," and which, when in the solid state, constitutes what are known as "chamber-crystals." The so-called "nitrous vitriol" which runs from the Gay-Lussac tower is simply a solution of this compound in excess of sulphuric acid, and never contains more than traces of any oxide or oxides of nitrogen other than the nitrous acid of this compound. In order, then, that the nitric peroxide contained in the chamber-gases shall be absorbed in the Gay-Lussac tower, that nitric peroxide must first be transformed either into nitrous acid or into such other oxide of nitrogen as, with the help or not of the free oxygen contained in the atmosphere of the Gay-Lussac tower, can become nitro-sulphonic acid on contact with the sulphuric acid of the Gay-Lussac tower, and such transformation is readily effected by sulphurous acid in the presence of the necessary quantity of water vapor and of free oxygen.

The sulphurous-acid gas which is to be mixed with the gases from the vitriol-chambers for the purposes of the present invention may be taken from the pyrites-burners or from the sulphur-burners, as the case may be; or it may be generated by whatever method in special apparatus. It may be either forced or aspirated by whatever means may be preferred in each particular case; but the method employed, whether for forcing it or for drawing it, must be one which shall admit of easily regulating at will the quantity of sulphurous acid delivered per unit of time.

In practically carrying out this invention we have employed what it will be convenient to call simply "sulphurous acid," but which in reality is a mixture of sulphurous-acid gas and other gases taken from pyrites-burners. By a pipe having an internal diameter of about four inches the sulphurous acid passes from the pyrites-burners into the lower part of a closed vertical cylinder dust-chamber constructed of lead, and about six feet high, with an internal diameter of about sixteen inches. The lower half of this chamber is immersed in a vessel through which cold water is kept running. In this chamber the sulphurous acid deposits any dust which it may have carried over from the pyrites-burners, and is at the same time cooled. The sulphurous acid passes from the upper part of the chamber by a pipe, also of about four inches in diameter, in which, at a distance of a few feet from the dust-chamber, is fixed an injector on the principle of the Körting injector, but made of an alloy of lead and antimony. Steam is supplied to the injector by a pipe of about half an inch bore. The injector draws the sulphurous acid from the pyrites-burners through the dust-chamber and forces it into a closed vertical annular cylindrical vessel immersed in an open vessel, through which last a current of cold water continually passes. The closed annular vessel is about three feet high. The diameter of the cylinder constituting its outer side is about twenty inches, and the diameter of the cylinder constituting its inner side about sixteen inches, the annular space between the two being about two inches across. The water which condenses in this annular vessel passes off from it by a tube curved like a swan's neck. The sulphurous acid having entered this vessel at the top passes from near the bottom of it again by a pipe of about four inches diameter into the lower part of a small tower, packed with coke, down which sulphuric acid is kept trickling. The tower is of lead, about ten feet high and two feet interior diameter. From the upper part of this tower the sulphurous acid finally passes by a pipe about two inches in diameter into the pipe by which the gases enter the Gay-Lussac tower. Such an apparatus has been found sufficient for the application of the invention to a set of vitriol-chambers having a total capacity of about one hundred and forty thousand cubic feet, and producing vitriol equal to about fifteen tons of monohydrated sulphuric acid per twenty-four hours. In the case of sets of chambers of greater capacity the proportion of the dimensions of the apparatus to the capacity of the vitriol-chambers may be a little smaller than that above indicated. The apparatus, however, should always be capable of delivering, to be mixed with the gases from the chambers, a quantity of sulphurous acid equal to about three per cent. of the quantity supplied to the chambers themselves. It will only be rarely that it will be necessary to mix with the exit-gases from the chambers so much sulphurous acid as the quantity constituting three per cent. of the quantity of sulphurous acid going into the chambers. It will, indeed, only be occasionally that it will be necessary to mix with the gases from the chambers half that quantity of sulphurous acid; but to meet extreme cases it is well to be able to mix with the exit-gases a quantity of sulphurous acid equal to three per cent. of that entering the chambers in the same time.

The regulation of the quantity of sulphurous acid to be added to and mixed with the gases passing from the chambers to the Gay-Lussac tower must be governed by tests of the gases passing from the tower. It is possible so to regulate the proportion of sulphurous acid added to the chamber-gases that the gases passing from the Gay-Lussac tower shall contain neither sulphurous acid nor nitrogen peroxide. To enable the process to be conducted, however, by an ordinary workman, without which it would not be practicable industrially, it is expedient to employ a method based on there being always a trace, though barely more than a trace, of sulphurous acid in the gases passing from the Gay-Lussac tower. The operator over the chambers is supplied with peroxide-of-lead paper, made by dipping filter-paper first in a dilute solution of acetate of lead, and then into a dilute solution of bleaching-powder. Paper impregnated by these means with peroxide of lead (if the solutions used are not too strong and the paper never be allowed to dry, but the stock of it be always kept in water) is an extremely delicate test for sulphurous acid. From time to time the operator immerses a wet piece of this peroxide-of-lead paper in the gases passing from the Gay-Lussac tower and observes the rate at which its loses color. If the right proportion of sulphurous-acid gas is being added to the gases from the chambers, the test-paper will not become decolorized within a certain definite time, which will be ascertained by experience. If the test-paper loses color more rapidly it indicates that too much sulphurous acid is being added to the gases from the chambers; if more slowly it shows that the supply of sulphurous acid is too small. To obtain uniform results by this method the test-paper should always be of the same depth of tint. Equally, of course, the rate at which the test-paper will become decolorized will depend partly upon its depth of tint and partly upon the rate at which the gases from the Gay-Lussac tower travel through the conduit in which the test-paper is exposed. Both of these conditions may differ in different works, so that the rate of decolorization corresponding to good working may differ in different cases, and should be specially determined once for all by regulating for a time the supply of sulphurous acid to the gases passing from the chambers to the Gay-Lussac tower by means of quantitative analyses of samples of the gases passing from the Gay-Lussac tower, and when in this way the right rate of supply of sulphurous-acid gas to the gases passing from the chambers to the Gay-Lussac tower has been arrived at, and the composition of the gases passing from the Gay-Lussac tower has been arrived at, and the composition of the gases passing from the Gay-Lussac tower has accordingly become such as should thenceforward be constantly maintained, then observing carefully the rate at which these gases decolorize such peroxide-of-lead paper, or that by which it is proposed that the working shall thereafter be conducted. As a general rule, however, it will be found that too much sulphurous acid is being supplied if the test-paper is decolorized in less than five or six minutes, and too little if it requires more than that time.

It must always be borne in mind that water is essential to the reactions by which the sulphurous acid supplied to the gases passing from the chambers to the Gay-Lussac tower is to determine the conversion into nitro-sulphonic acid of the nitric peroxide contained in these gases; and that if the requisite quantity of water be not present, these reactions cannot take place. As the degree of humidity of the exit-gases from the chambers varies with the state of the atmosphere and with other circumstances, while it is desirable that the mixture of these gases with the sulphurous acid should always contain approximately the same quantity of moisture in proportion to the nitric peroxide and sulphurous acid contained in said gases, it may occasionally be necessary to vary the humidity of the sulphurous-acid gas added to the chamber-gases by varying the strength of the sulphuric acid supplied to the small coke-tower which the sulphurous-acid gas traverses immediately before being added to the gases from the chambers. If there should be an insufficiency of moisture with the gases, such insufficiency will be indicated by nitric peroxide passing off from the Gay-Lussac tower, notwithstanding that enough sulphurous acid has been supplied to the gases entering it to secure the conversion of all their nitric peroxide into nitro-sulphonic acid had sufficient moisture for that purpose been present.

To obtain the best possible results by means of the present invention, the chambers should be so worked that the gases issuing from them shall contain not less than five or more than seven per cent. of free oxygen.

Having thus described the nature of the said invention and the manner of carrying the same into effect, what we claim is—

The method of economizing nitrous compounds in the manufacture of the sulphuric acid, as described, by mixing sulphurous-acid gas with the gases which enter the Gay-Lussac tower, substantially as set forth.

In witness whereof we have hereunto signed our names in the presence of two subscribing witnesses.

FRÉDÉRIC BENKER.
HENRI LASNE.

Witnesses:
DE ROUGEMONT,
ROBT. M. HOOPER.